(12) United States Patent
Schuh et al.

(10) Patent No.: US 12,299,326 B2
(45) Date of Patent: May 13, 2025

(54) ADAPTIVE COMMAND COMPLETION TIMERS

(71) Applicant: Micron Technology, Inc., Boise, ID (US)

(72) Inventors: Karl D. Schuh, Santa Cruz, CA (US); Daniel J. Hubbard, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 84 days.

(21) Appl. No.: 17/561,508

(22) Filed: Dec. 23, 2021

(65) Prior Publication Data

US 2023/0205455 A1 Jun. 29, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0613* (2013.01); *G06F 3/0653* (2013.01); *G06F 3/0679* (2013.01)
(58) Field of Classification Search
CPC .... G06F 3/0604; G06F 3/0613; G06F 3/0653; G06F 3/0659; G06F 3/0679
See application file for complete search history.

(56) References Cited

U.S. PATENT DOCUMENTS

| | | | |
|---|---|---|---|
| 11,106,366 B1* | 8/2021 | Bhatia | G11C 16/3495 |
| 2018/0188991 A1* | 7/2018 | Dash | G06F 3/0611 |
| 2019/0265907 A1* | 8/2019 | Yang | G06F 3/0604 |
| 2020/0004456 A1* | 1/2020 | Williams | G06F 3/061 |
| 2021/0103406 A1* | 4/2021 | Moon | G06F 3/0673 |
| 2021/0191648 A1* | 6/2021 | Karuppiah | G06F 3/0659 |
| 2021/0216248 A1* | 7/2021 | Kanamori | G11C 16/14 |
| 2021/0389878 A1* | 12/2021 | Lindberg | G06F 3/0659 |

* cited by examiner

*Primary Examiner* — Tracy A Warren
(74) *Attorney, Agent, or Firm* — NICHOLSON DE VOS WEBSTER & ELLIOTT LLP

(57) ABSTRACT

Exemplary methods, apparatuses, and systems include receiving a request to perform an operation in memory. A subdivision of the memory to which the request is directed is determined. A command completion time based upon a command type for the operation and which subdivision of the memory to which the request is directed is determined. A command is sent to the memory for the operation. A request is sent to the memory for a status of the command based upon the determined command completion time.

19 Claims, 4 Drawing Sheets

ADAPTIVE COMMAND COMPLETION TIMERS

TECHNICAL FIELD

The present disclosure generally relates to command completion timers, and more specifically, relates to implementing and maintaining a dynamic command completion timer per subdivision of memory.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
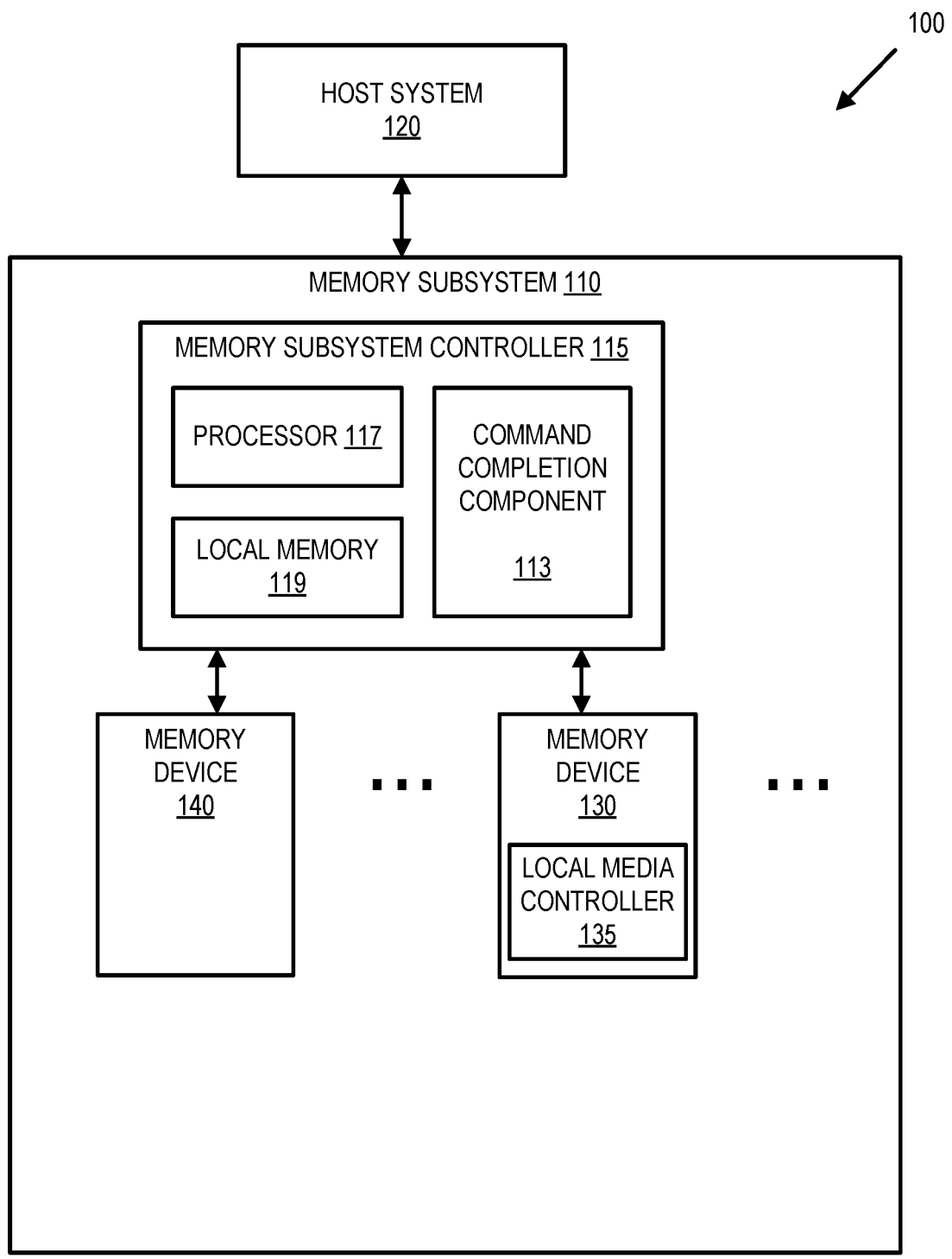
FIG. 1 illustrates an example computing system that includes a memory subsystem in accordance with some embodiments of the present disclosure.

Aspects of the present disclosure are directed to a memory subsystem implementing and maintaining a dynamic, tunable command completion timer per subdivision of memory. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states. Each of these types of cells can be referred to as having a different bit density, or simply density. For example, a TLC storing three bits of data has a greater bit density than an MLC storing two bits of data.

When issuing a command to memory, a memory controller uses a command completion timer and sends a request to memory for the status of the command upon expiration of the command completion time for that command Memory components or subdivisions of memory (e.g., memory dice or blocks of memory) can have different command completion times for the same operation. This difference in command completion time can occur in memory components having the same bit density. For example, variations that result from memory manufacturing processes and/or the physical layout of memory can result in different command completion times. When the difference in command completion times is too great, it can lead to discarding outliers (e.g., the memory components having the fastest and/or slowest command completion times not being used) to have relatively consistent command completion times. Additionally, or alternatively, memory subsystems can set a command completion timer based upon a worst-case scenario, e.g., setting the command completion time for multiple memory components to the time of the slowest command completion time of the group. As a result, the memory subsystem limits the performance of memory components that can complete operations in less time. Using uniform, worst-case command completion times can also create a performance bottleneck in status requests. Additionally, the tuning of memory components to operate based on uniform, worst-case command completion times incurs time and financial costs in manufacturing.

Aspects of the present disclosure address the above and other deficiencies by using a dynamic, tunable command completion timer per subdivision of memory (e.g., per memory die or memory block) rather than a uniform time based upon a worst-case time per operation. For example, the memory subsystem can use multiple timers, with command completion time values based upon memory component design, manufacturing characterization, and run-time testing. Additionally, the memory subsystem can dynamically tune the command completion timers. For example, by sending a status request early (before timer expiration), the memory subsystem can detect when a subdivision of memory is completing a command faster than the current command completion time value. In other words, if the command complete response to the status request is also early, the memory subsystem can update the timer to represent a faster command completion time. Likewise, if the response to a status request is late as compared to the current command completion time, the memory subsystem can update the timer to represent a slower command completion time. Dynamic, tunable command completion timers allow for a wider range of memory components, reducing the amount of dice discarded due to manufacturing differences and reducing the cost of the manufacturing process related to tuning dice to worst-case command completion metrics.

Dynamic, tunable command completion timers can also increase system performance by allowing memory components with short command completion times to operate at higher speeds, while maintaining or increasing the reliability of the memory components.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a command completion component 113 that can implement and maintain a dynamic, tunable command completion timer per subdivision of memory. In some embodiments, the controller 115 includes at least a portion of the command completion component 113. For example, the controller 115 can include a processor 117 (processing device) configured to execute instructions stored in local memory 119 for performing the operations described herein. In some embodiments, a command completion component 113 is part of the host system 120, an application, or an operating system.

The command completion component 113 can the memory subsystem can use multiple timers, with timer values based upon memory component design, manufacturing characterization, and/or run-time testing. Additionally, the memory subsystem can tune the command completion timers based upon run-time testing. Further details with regards to the operations of the command completion component 113 are described below.

Figure 2:
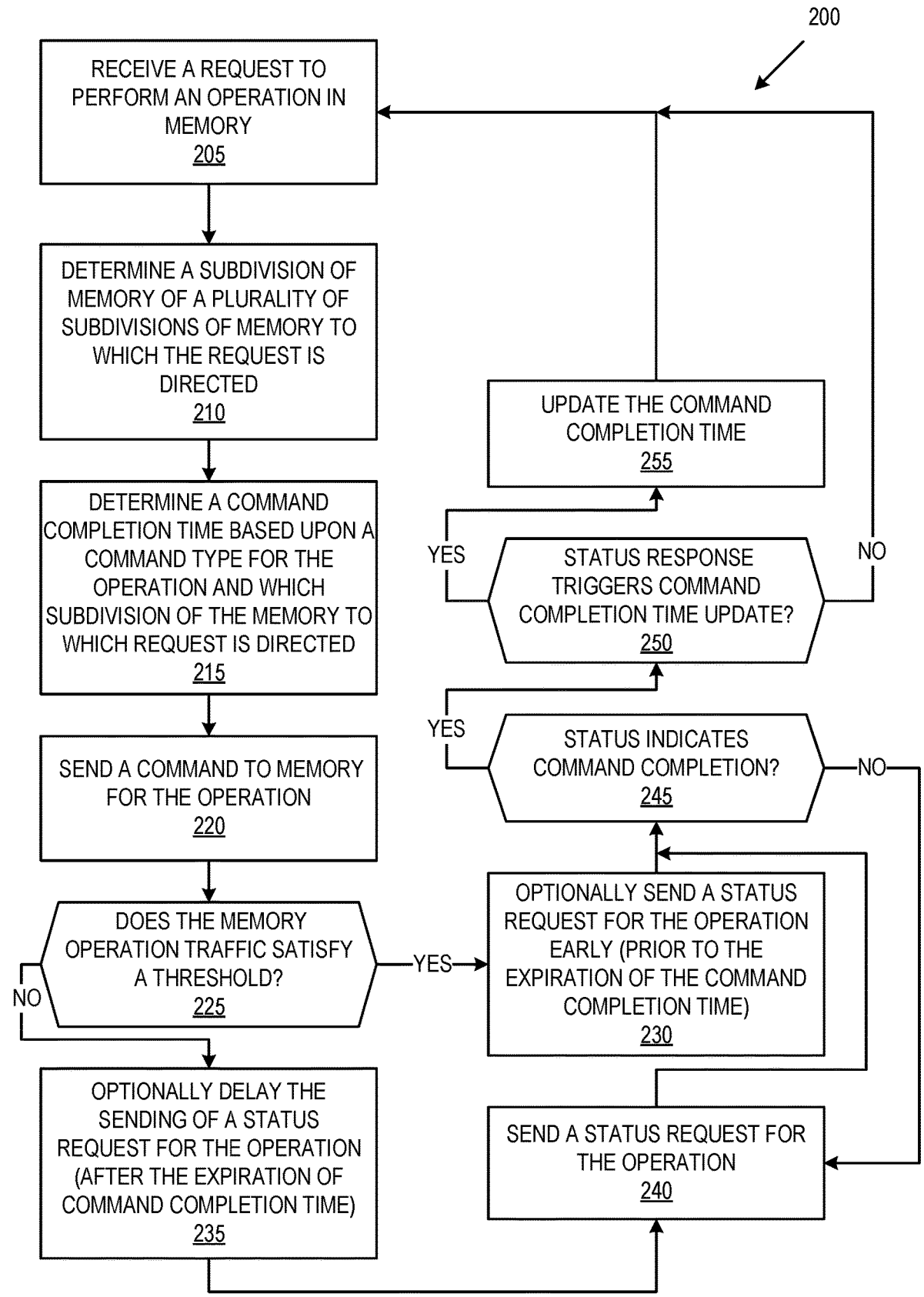
FIG. 2 is a flow diagram of an example method to implement and maintain a dynamic, tunable command completion timer per subdivision of memory in accordance with some embodiments of the present disclosure.

FIG. 2 is a flow diagram of an example method 200 to implement and maintain a dynamic, tunable command completion timer per subdivision of memory in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the command completion component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device receives a request to perform an operation in memory. For example, memory subsystem controller 115 can receive a request from the host system 120 to read or write data to memory device(s) 130.

At operation 210, the processing device determines a subdivision of memory of a plurality of subdivisions of memory to which the request is directed. For example, the command completion component 113 manages separate command completion timers per memory die, a subdivision of a memory die such as a memory block, plane, sub-block, page, or another subdivision of memory. In one embodiment, the command completion timers are set based upon component design, manufacturing characterization, and/or run-time testing. Command completion times can differ between similar subdivisions of memory, such as memory blocks having the same bit density (e.g., two TLC memory blocks) or memory dice having the same bit density (e.g., two SLC memory dice). The command completion component 113 can use a logical address from the request, or corresponding physical address, to determine which one or more of those subdivisions of memory are the subject of the memory operation.

At operation 215, the processing device determines a command completion time based upon a command type for the operation and which subdivision of the memory to which request is directed. For example, the command completion component 113 maintains a lookup table or other data structure in the local memory 119 that maps each subdivision of memory to a command completion time per command type. In one embodiment, the command completion component 113 breaks the requested operation into multiple commands and determines a command completion time for each of the multiple commands. In one embodiment, the processing device determines the command completion time further based upon the current state of the memory, such as an operating temperature of the subdivision of memory or history of commands sent to the subdivision of memory. For example, an operating temperature that satisfies a first threshold correlates to operations completing slower than average and an operating temperature that satisfies a second threshold correlates to operations completing faster than average. As another example, one or more commands in a history of commands can take additional time during an operation to recalibrate, correlating to operations completing slower than average.

At operation 220, the processing device sends a command to the memory for the operation. For example, if the operation is a write, the memory subsystem controller 115 sends a command to a memory device 130 to cause host data to be written to memory. In one embodiment, the command completion component 113 starts a command completion timer when the command is sent. For example, the command completion component 113 can use a timer to count up to or down from the determined command completion time. In another embodiment, the command completion component 113 uses a time stamp when the command is sent to track time elapsed as compared to the determined command completion time.

At operation 225, the processing device determines if the memory operation traffic satisfies a threshold. For example, the memory subsystem controller 115 tracks memory commands and other traffic across a memory bus to memory device(s) 130 and, when the traffic is less than a threshold amount or percentage of the capacity of the bus, command completion component 113 can determine that memory operation traffic satisfies the threshold. As another example, when the traffic is greater than a threshold amount or percentage of the capacity of the bus, command completion component 113 determines that memory operation traffic fails to satisfy the threshold. When the memory operation traffic satisfies the threshold, the method 200 proceeds to operation 230. When the memory operation traffic fails to satisfy the threshold, the method 200 proceeds to operation 235.

At operation 230, the processing device optionally sends a status request for the operation early. For example, the command completion component 113 causes the memory subsystem controller 115 to send a status request to a memory device 130 prior to the expiration of the determined command completion time when memory bus traffic is below a threshold amount. As a result, the command completion component 113 can utilize extra memory bus bandwidth to dynamically test command completion time for the subdivision of memory and determine if that command completion time can be reduced or otherwise updated. Alternatively, the command completion component 113 can cause the memory subsystem controller 115 to send the status request to a memory device 130 upon the expiration of the determined command completion time. For example, the command completion component 113 can limit how often it tests command completion time by sending an early status request for a subdivision of memory a limited number of times per predetermined period (e.g., once per millisecond, second, minute, hour, day, or other amount of time).

At operation 235, the processing device optionally delays the sending of a status request for the operation. For example, the command completion component 113 causes the memory subsystem controller 115 to send a status request to a memory device 130 at a delayed amount of time after the expiration of command completion time. As a result, the command completion component 113 can utilize the delay to give the memory bus bandwidth utilization an opportunity to decrease before sending the status request. Alternatively, the command completion component 113 can cause the memory subsystem controller 115 to send the status request to a memory device 130 upon the expiration of the determined command completion time (i.e., not add a delay to the end of the command completion time).

At operation 240, the processing device sends a status request for the operation. For example, the command completion component 113 causes the memory subsystem controller 115 to send a status request to a memory device 130 upon the expiration of the determined command completion time or after a delayed amount of time following the command completion time as described above.

At operation 245, the processing device determines if a status response indicates command completion. For example, the memory device 130 responds to the status request from the memory subsystem controller 115 with a current status of the operation, indicating whether or not the operation is complete. If the status response indicates command is not complete, the method 200 returns to operation 240 to continue to poll the status of the command. In an embodiment in which the status request was sent early, the processing device sends the next status request upon expiration command completion time. In an alternate embodiment, if the status response indicates command is not complete, the method 200 returns to operation 225 to optionally send another early status request or delay the sending of a status request based on memory operation traffic as described above. If the status response indicates command is complete, the method 200 proceeds to operation 250.

At operation 250, the processing device determines if the status response triggers a command completion time update. For example, when the memory subsystem controller 115 sends a status request early, the command completion component 113 detects a command completion status response to the early request as a trigger to update/decrease the command completion time. As another example, when the memory subsystem controller 115 sends a status request upon/after expiration of the command completion time, the command completion component 113 detects an incomplete command status response to the request as a trigger to increase the command completion time. If the status response triggers a command completion time update, the method 200 proceeds to operation 255. If the status response does not trigger a command completion time update, the method 200 returns to operation 205.

At operation 255, the processing device updates the command completion time. As described above, a command completion response to an early status request can trigger the command completion component 113 to decrease the command completion time for the subdivision of memory and an incomplete command status response to an on-time request can trigger the command completion component 113 to increase the command completion time for the subdivision of memory.

Figure 3:
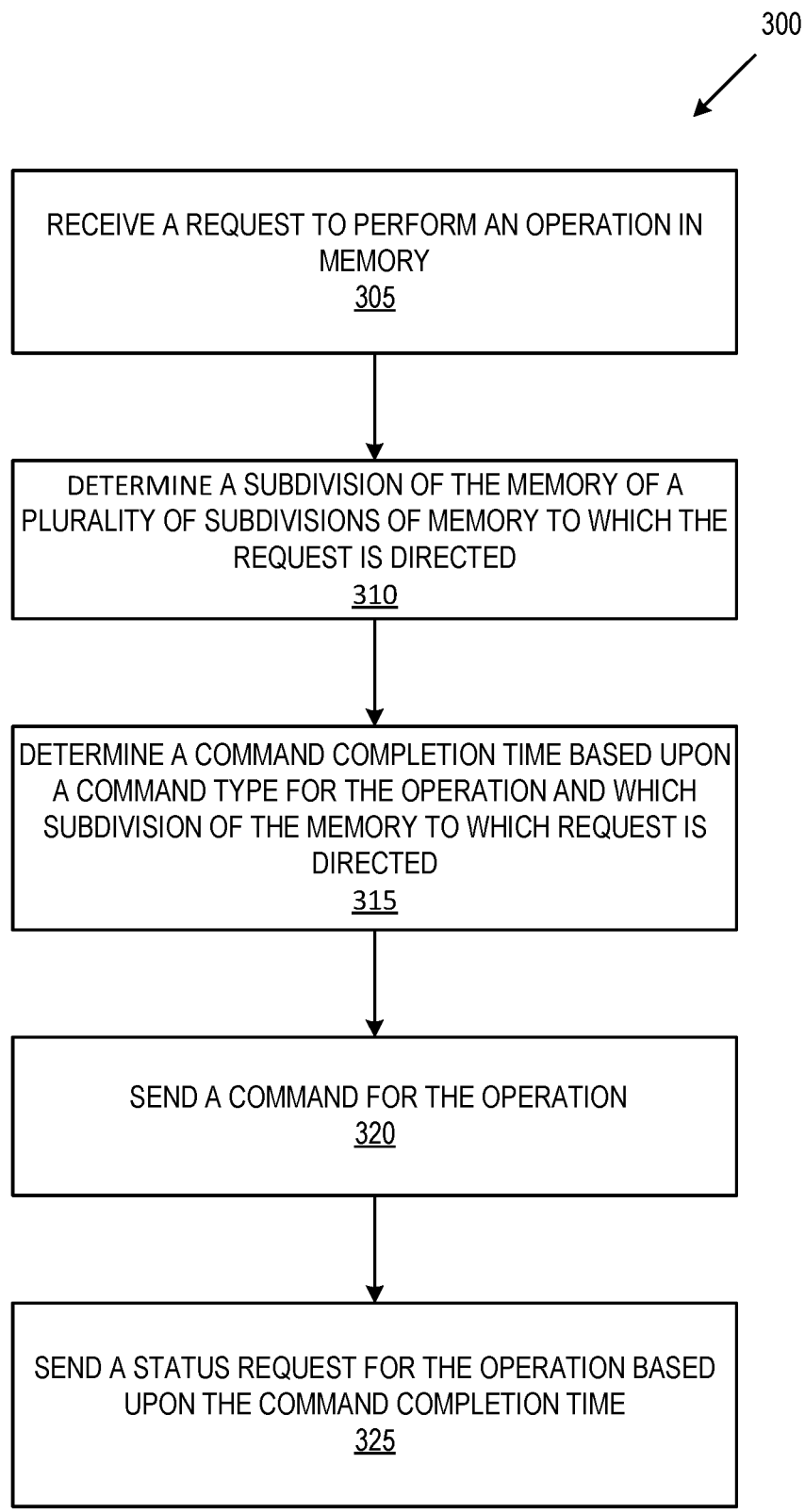
FIG. 3 is a flow diagram of another example method to implement a command completion timer per subdivision of memory in accordance with some embodiments of the present disclosure.

FIG. 3 is a flow diagram of another example method 300 to implement a command completion timer per subdivision of memory in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the command completion component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives a request to perform an operation in memory. For example, the memory subsystem controller 115 receives a read or write request from the host system 120 as described above with reference to operation 205.

At operation 310, the processing device determines a subdivision of memory of a plurality of subdivisions of memory to which the request is directed. For example, the command completion component 113 uses an address corresponding to the request to determine which one or more of those subdivisions of memory are the subject of the memory operation as described above with reference to operation 210.

At operation 315, the processing device determines a command completion time based upon a command type for the operation and which subdivision of the memory to which request is directed. For example, the command completion component 113 uses a lookup table or other data structure to map the subdivision of memory to a command completion time for the command type as described above with reference to operation 215.

At operation 320, the processing device sends a command to the memory for the operation. For example, the memory subsystem controller 115 sends a command for a read or write operation to a memory device 130 and starts a command completion timer or otherwise tracks time elapsed when the command is sent as described above with reference to operation 220.

At operation 325, the processing device sends a status request for the operation based upon the command completion time for the subdivision of memory. For example, the command completion component 113 causes the memory subsystem controller 115 to send a status request to a memory device 130 prior to, upon the expiration of the determined command completion time, or after a delayed amount of time following the command completion time as described above with reference to operations 230 and 240.

Figure 4:
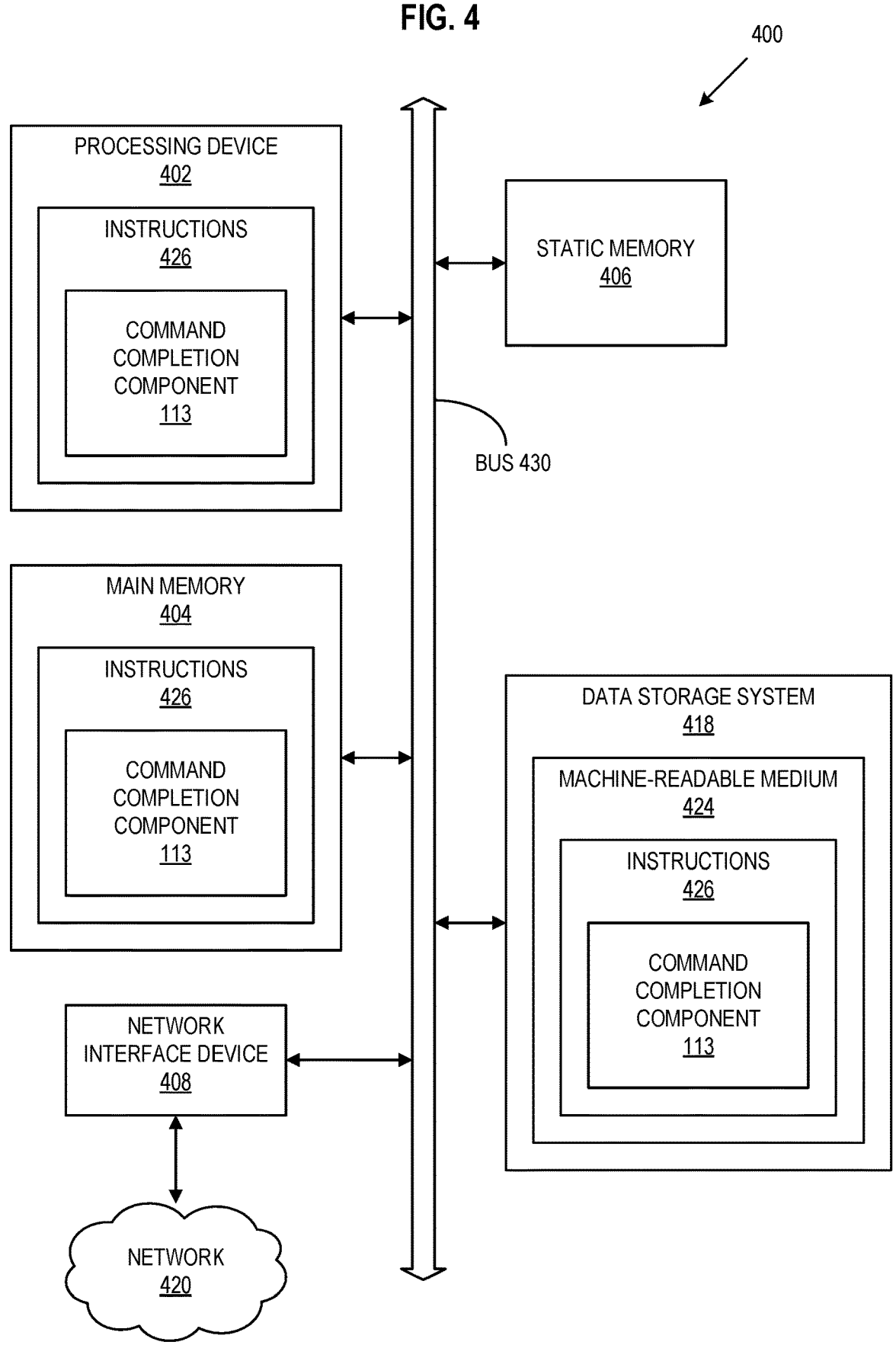
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the command completion component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a command completion component (e.g., the command completion component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request to perform an operation in memory, wherein the memory comprises a plurality of subdivisions and wherein the plurality of subdivisions are of a same bit density;
   determining a subdivision of the plurality of subdivisions to which the request is directed, wherein the subdivision is a memory die;
   determining a command completion time based upon a command type for the operation and the subdivision to which the request is directed;
   sending a command to the memory for the operation;
   detecting that memory operation traffic is less than a threshold amount of a memory bus; and
   sending a request to the memory for a status of the command prior to expiration of the determined command completion time in response to detecting that the memory operation traffic is less than the threshold amount of the memory bus.

2. The method of claim 1, further comprising:
   receiving a response to the request for the status of the command indicating the command was completed; and
   reducing a value of the command completion time in response to receiving the response.

3. The method of claim 1, further comprising:
   receiving a second request to perform a second operation in the memory;
   determining a second subdivision of the plurality of subdivisions to which the second request is directed;
   determining a second command completion time based upon a second command type for the second operation and the second subdivision to which the second request is directed;
   sending a second command to the memory for the second operation;
   sending a second request to the memory for a second status of the second command based upon the determined second command completion time;
   detecting a delay in completion of the second command based on a response to the second request to the memory for the second status; and
   increasing a value of the second command completion time in response to detecting the delay.

4. The method of claim 3, wherein sending the second request based upon the determined second command completion time includes delaying the sending the second request after expiration of the second command completion time in response to detecting that memory operation traffic does not satisfy the threshold.

5. The method of claim 1, wherein determining the command completion time is further based upon a current state of the subdivision of memory.

6. A non-transitory computer-readable storage medium comprising instructions that, when executed by a processing device, cause the processing device to:
   receive a request to perform an operation in memory, wherein the memory comprises a plurality of subdivisions and wherein the plurality of subdivisions are of a same bit density;
   determine a subdivision of the plurality of subdivisions to which the request is directed, wherein the subdivision is a memory die;

determine a command completion time based upon a command type for the operation and the subdivision to which the request is directed;
send a command to the memory for the operation;
detect that memory operation traffic is less than a threshold amount of a memory bus; and
send a request to the memory for a status of the command prior to expiration of the determined command completion time in response to detecting that the memory operation traffic is less than the threshold amount of the memory bus.

7. The non-transitory computer-readable storage medium of claim 6, wherein the processing device is further to:
receive a response to the request for the status of the command indicating the command was completed; and
reduce a value of the command completion time in response to receiving the response.

8. The non-transitory computer-readable storage medium of claim 6, wherein the processing device is further to:
receive a second request to perform a second operation in the memory;
determine a second subdivision of the plurality of subdivisions to which the second request is directed;
determine a second command completion time based upon a second command type for the second operation and the second subdivision to which the second request is directed;
send a second command to the memory for the second operation;
send a second request to the memory for a second status of the second command based upon the determined second command completion time;
detect a delay in completion of the second command based on a response to the second request to the memory for the second status; and
increase a value of the second command completion time in response to detecting the delay.

9. The non-transitory computer-readable storage medium of claim 8, wherein sending the second request based upon the determined second command completion time includes delaying the sending the second request after expiration of the second command completion time in response to detecting that memory operation traffic does not satisfy the threshold.

10. The non-transitory computer-readable storage medium of claim 6, wherein determining the command completion time is further based upon a current state of the subdivision of memory.

11. A system comprising:
a plurality of memory devices; and
a processing device, operatively coupled with the plurality of memory devices, to:
receive a request to perform an operation in memory, wherein the memory comprises a plurality of subdivisions and wherein the plurality of subdivisions are of a same bit density;
determine a subdivision of the plurality of subdivisions to which the request is directed, wherein the subdivision is a memory die;
determine a command completion time based upon a command type for the operation and the subdivision to which the request is directed;
send a command to the memory for the operation;
detect that memory operation traffic is less than a threshold amount of a memory bus;
send a request to the memory for a status of the command prior to expiration of the determined command completion time in response to detecting that the memory operation traffic is less than the threshold amount of the memory bus;
receive a response to the request indicating that the command was completed; and
reduce a value of the command completion time in response to receiving the response.

12. The system of claim 11, wherein the processing device is further to:
receive a second request to perform a second operation in the memory;
determine a second subdivision of the plurality of subdivisions to which the second request is directed;
determine a second command completion time based upon a second command type for the second operation and the second subdivision to which the second request is directed;
send a second command to the memory for the second operation;
send a second request to the memory for a second status of the second command based upon the determined second command completion time;
detect a delay in completion of the second command based on a second response to the second request to the memory for the second status; and
increase a value of the second command completion time in response to detecting the delay.

13. The system of claim 12, wherein sending the second request based upon the determined second command completion time includes delaying the sending the second request after expiration of the second command completion time in response to detecting that memory operation traffic does not satisfy the threshold.

14. The method of claim 1, wherein the threshold amount of the memory bus is a threshold percentage of the memory bus.

15. The non-transitory computer-readable storage medium of claim 6, wherein the threshold amount of the memory bus is a threshold percentage of the memory bus.

16. The system of claim 11, wherein the threshold amount of the memory bus is a threshold percentage of the memory bus.

17. The method of claim 1, wherein determining a subdivision of the plurality of subdivisions comprises:
determining a memory block of the memory die, wherein determining the command completion time is further based on the memory block.

18. The method of claim 1, wherein determining a subdivision of the plurality of subdivisions comprises:
determining a memory plane of the memory die, wherein determining the command completion time is further based on the memory plane.

19. The non-transitory computer-readable storage medium of claim 6, wherein determining a subdivision of the plurality of subdivisions comprises:
determining a memory block of the memory die, wherein determining the command completion time is further based on the memory block.

* * * * *